(12) United States Patent
Duong (10) Patent No.: US 10,634,374 B1
(45) Date of Patent: *Apr. 28, 2020

(54) METHOD AND SMART AIR CONDITIONING SYSTEM

(71) Applicant: Thuy Van T. Duong, Ho Chi Minh (VN)

(72) Inventor: Thuy Van T. Duong, Ho Chi Minh (VN)

(73) Assignee: TON DUC THANG UNIVERSITY, Ho Chi Minh (VN)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,802

(22) Filed: Apr. 9, 2017

(51) Int. Cl.
*F24F 3/00* (2006.01)
*F24F 11/00* (2018.01)
*F24F 3/16* (2006.01)
*F24F 5/00* (2006.01)
*A47C 21/04* (2006.01)

(52) U.S. Cl.
CPC ............ *F24F 11/006* (2013.01); *A47C 21/04* (2013.01); *F24F 3/00* (2013.01); *F24F 3/1603* (2013.01); *F24F 5/0096* (2013.01); *F24F 11/0012* (2013.01); *F24F 2003/005* (2013.01); *F24F 2003/1617* (2013.01); *F24F 2003/1625* (2013.01); *F24F 2011/0061* (2013.01); *F24F 2011/0073* (2013.01)

(58) Field of Classification Search
CPC .......... F24F 11/006; F24F 3/00; F24F 3/1603; F24F 5/0096; F24F 11/0012; A47C 21/04; A47C 21/044; A47C 21/048
USPC .......................................................... 165/205
See application file for complete search history.

(56) References Cited

U.S. PATENT DOCUMENTS

| 2005/0284168 | A1* | 12/2005 | Lee ........................ | F24F 1/0007 62/317 |
| 2008/0148481 | A1* | 6/2008 | Brykalski ............ | A47C 21/048 5/423 |
| 2010/0011502 | A1* | 1/2010 | Brykalski ............ | A47C 21/044 5/423 |
| 2010/0055795 | A1* | 3/2010 | Lee ..................... | B01D 67/0058 436/43 |
| 2015/0282631 | A1* | 10/2015 | Creamer .............. | A47C 21/044 5/423 |

* cited by examiner

Primary Examiner — Davis Hwu (57) ABSTRACT

A method and system for providing a specific temperature to a specific bed in a common room having a plurality of beds is disclosed that include: an air filtering module for cleaning the air in the common room, a primary air conditioning module for setting a common temperature, a plurality of secondary air conditioning modules for setting a specific temperature at each bed, a plurality of air circulating modules for creating a convection current of the specific temperature from underneath each bed, and a central processing unit (CPU) for setting specific temperatures of each bed in accordance with a mode selected from an auto mode, a manual mode, and a timing control mode.

20 Claims, 7 Drawing Sheets

METHOD AND SMART AIR CONDITIONING SYSTEM

CLAIM OF PRIORITY

This application is a continuation-in-part of application Ser. No. 14/828,451, filed on, entitled, "Smart Home System". The patent application identified above is incorporated here by reference in its entirety to provide continuity of disclosure.

FIELD OF THE INVENTION

The present invention relates generally to the field of smart home system. More specifically, the present invention relates to a method and smart system for setting specific usage preference temperatures for each user in a room having a plurality of beds.

BACKGROUND ART

Indoor environmental conditions substantially influence health and productivity of a person. These conditions include temperature, air flows, and air quality. Among these conditions, air flows and air quality can be universally set for all persons. However, each person usually prefers a particular temperature range. Some people prefers cold temperatures, some prefers hot temperatures, and some prefers mild temperatures. These temperature ranges depend on each person's health conditions, mood, and outdoor weather. The most comfortable temperature yields optimal rehabilitating environment. In a room which has a plurality of beds reserved for a plurality of users who do not move around a lot, setting a specific optimal temperature range for each user in a common room can be a challenge. Examples for such a room includes rehabilitating rooms in a hospital. Examples for such users include patients and elderly.

In many hospitals, thermal conditions are not well-controlled due to large thermal zones, improper control system design or operation, or other factors. Thermal conditions inside a rehabilitating room varies considerably with time as outdoor conditions change, spatial distribution of beds, mood, and health conditions. Thus, it is crucial that each user can change the temperature at his or her own bed, and therefore achieving an optimal health condition locally. When users cannot set their own optimal temperatures after surgery or due to incapacity, it is also crucial that doctors, nurses can set a specific optimal temperature for each patient depending on the patient's health conditions.

When doctors and/or nurses are too busy or cannot set specific optimal temperature for each patient, it is crucial that there is a system that can set specific optimal temperature for each patient.

Therefore what is needed is a smart heating, ventilating, and air conditioning (HVAC) system capable of solving the above listing problems to provide specific an optimal temperature for each user in a common room having a plurality of beds.

SUMMARY OF THE INVENTION

Accordingly, an objective of the present invention is to provide system for providing a specific temperature to a specific bed in a common room having a plurality of beds is disclosed that include: an air filtering module for cleaning the air in the common room, a primary air conditioning module for setting a common temperature, a plurality of secondary air conditioning modules for setting a specific temperature at each bed, a plurality of air circulating modules for creating a convection current of the specific temperature from underneath each bed, and a central processing unit (CPU) for setting specific temperatures of each bed in accordance with a mode selected from an auto mode, a manual mode, and a timing control mode.

Another objective of the present invention is to provide a method for providing a specific temperature to a specific bed in a common room having a plurality of beds, which comprising: circulating the air inside of said common room to a filtering module along a first path; filtering out impurities from that air to create a clean air using and sending the purified air to the common room along a second path; setting a common temperature for the common room using a primary air cooling module; setting a specific temperature for each bed using a secondary air conditioning module, wherein the secondary air conditioning module is controlled by a central processing unit (CPU) employing either a manual mode, an auto mode, or a timing control mode.

These advantages of the disclosed method and system of the present invention for providing a specific temperature for a specific in a room having a plurality of beds can be listed in detail as followings:

Low costs.

Capability of providing a healthy living condition for many people.

Capability of providing a specific temperature at a specific bed.

Capability of providing different operation modes convenient to patients, doctors, nurses, or other assistants.

Capability of providing a clean and purified air in a common room.

Capability of providing a constant flow of air necessary for a healthy living conditions.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
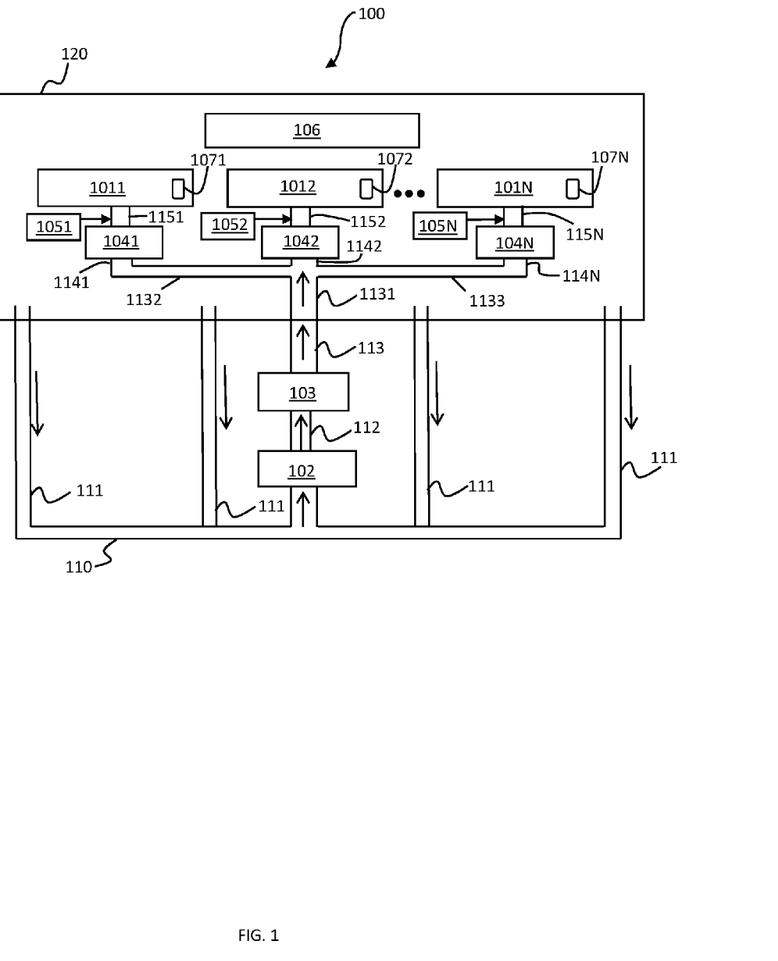
FIG. 1 is a schematic diagram illustrating a smart air conditioning system in a common room having a plurality of beds in accordance with an embodiment of the present invention.

Referring now to FIG. 1 which illustrates a schematic diagram of a common room equipped with a smart air conditioning system 100 in accordance with an exemplary embodiment of the present invention. A common room 120 is any rehabilitating room having a plurality of beds 1011, 1012, ..., 101N (1011-101N) equipped the smart air conditioning system 100 of the present invention. In one illustrating embodiment, smart air conditioning system 100 of the present invention includes, but not limited to, an air filtering module 102; a primary air conditioning module 103; a plurality of secondary air conditioning modules 1041, 1042, ..., 104N (1041-104N); a plurality of air circulating modules 1051, 1052, ... 105N (1051-105N); a central processing unit (CPU) 106; and a plurality of temperature controller units 1071, 1072, ... to 107N (1071-107N). Each bed, 1011-101N, is equipped with one temperature controller unit 1071-107N for setting a specific temperature ($T_1(t)$, $T_2(t)$, ... $T_N(t)$) at each bed in accordance with the preference and/or the health condition of each patient. More specifically, bed 1011 is set at $T_1(t)$, bed 1012 is set at $T_2(t)$, ..., and bed 101N is set at $T_N(t)$. Note that $T_i(t)$ is a function of time and where i=1, 2, ... N, an index indicating a specific bed. In an exemplary embodiment of the present invention, CPU 106 also includes a memory (not shown) that stores a sequence of specific temperatures of each bed 1011-101N into a sequence and keep tracks of the time each specific temperature is turned on ($t_{ON}$) or turned off ($t_{OFF}$). For example, CPU 106 keeps track of $T_1(t_{ON})$, $T_1(t_{OFF})$, $T_2(t_{ON})$, $T_2(t_{OFF})$ ..., $T_N(t_{ON})$, and $T_N(t_{OFF})$.

Continuing with FIG. 1, the structure of smart air conditioning system 100 is now described. Primary air conditioning module 103 is installed underground at a first distance $d_1$ outside of common room 120. Preceded and aligned in a straight line with primary air conditioning module 103 is air filtering module 102 also installed underground at a second distance $d_2$ greater than $d_1$. Air filtering module 102 receives air from a multitude of input paths 111 circling out from to common room 120. Air filtering module 102 removes contaminants and impurities such as soot, powdered metals, pollen, dust particles, mold and its spores, etc. from common rom 120. The cleaned air free of impurities is circled back to primary air conditioning module 103 via an air filtering output path 112. Next, primary air conditioning module 103 brings the cleaned air to a common temperature at $T_C$ degrees. An exterior air duct 113 that connects the output of primary air conditioning module 103 through the wall and into the interior of common room 120. Behind the interior side of a wall of common room 120, exterior air duct 113 is divided into three main interior air ducts 1131, 1132, and 1133. That is, once exterior primary air conditioning output duct 113 goes through the wall of common room 120, it becomes the main branch of interior primary air conditioning input duct 1131. Exterior primary air conditioning output duct 113 and interior primary air conditioning input duct 1131 delivers the air at $T_C$ degrees into a plurality of second air conditioning input ducts 1141, 1142, ..., to 114N (1141-114N) to each plurality of beds 1011-101N respectively. In one exemplary embodiment, each plurality of second air conditioning input ducts 1141-114N is a small tube having a diameter of 50 mm. Plurality of second air conditioning input ducts 1141-114N are routed along the interior walls of common room 120 from three main interior primary air conditioning input ducts 1131, 1132, and 1133 to the underneath of the mattress of each bed 1011-101N. There, each plurality of second air conditioning input ducts 1141-114N is connected to secondary air conditioning module 1041-104N placed underneath each plurality of beds 1011-101N respectively.

Continuing with FIG. 1, each plurality of beds 1011-101N has a temperature controller unit 1071-107N respectively. Each temperature controller unit 1071-107N is electrically coupled to communicate with CPU 106. CPU 106 is programmed to control the temperatures of plurality of beds 1011-101N by three principal modes: a manual mode, an auto mode, and a time set mode. The operation and detailed description of each module mentioned above will be described in the following figures.

Figure 2:
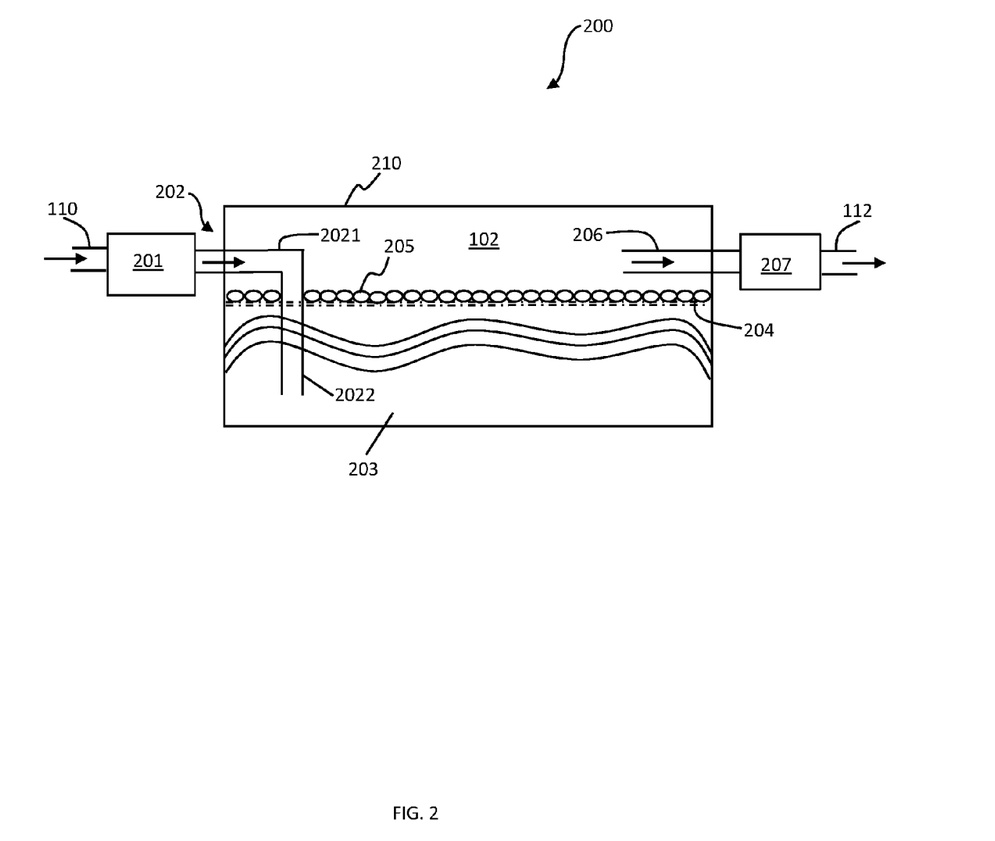
FIG. 2 is a schematic diagram of an air filtering module in accordance with an embodiment of the present invention.

Now referring to FIG. 2, a schematic diagram 200 of air filtering module 102 is illustrated. In one embodiment, air filtering module 102 is an air-tight metal container 210 with rectangular cross section having a height of 2 meters, a width of 2 meters, and a length of 4 meters. Inside, container 120 consists mainly of water 203 up to one meter in height. The pH of water inside container 210 is measured and kept neutral to avoid toxicity. A silver (Aluminum) screen 204 is placed at 0.3 meter above the surface of water 203. An activated carbon layer 205 is spread evenly on the top surface of aluminum screen 204.

Continuing with the description of FIG. 2, as alluded above, air filtering unit 102 is placed underground at a distance $d_1$ from an exterior wall of common room 120. At the input end of container 210, a first air suction device 201 draws air from the interior of common room 120 to air filtering input channel 110. These underground multitude of outlet channels are convergent into an air filtering input channel 110 of first air suction device 201. Thus, the air from room 120 is then channeled into the interior of container 210 by a water container input 202. In one exemplary embodiment, underground multitude of outlet channels 110, air filtering input channel 110, and water container input 202 all have the same diameter of 200 mm. Water container input 202 has two sections: a first input section 2021 and a second input section 2022. First section 2021 connects the output of first air suction device 201 into the interior of water container 210. First section 2021 is placed at 0.3 meter from the top surface and extends about 0.5 meter into the interior of water container 210. Then, second section 2022 begins and is bent 90 degrees from first section 2021. Second section 2022 extends below the surface and stops at a distance of 0.2 m from the bottom of water 203.

Still referring to FIG. 2, at the output side of water container 210, a water container output of 206 is placed at the distance of 0.3 meter from the top surface of water container 210. In operation, with the above illustrating embodiments of air filtering module 102, the air from common room 210 is undergone two different stages of purification process. First, pH neutral water 203 washes away heavy contaminants that attached to the air such as dusts. Second, large surface area activated carbon layer 205 adsorbs the remaining contaminants in the air. The air purification properties of activated carbon and pH neutral water are well-known in the art and need not be discussed in details here. Second air suction device 207 draws the air that has been purified by water 203 and activated carbon layer 204 into water container output 206 and then air filter output channel 112. In one exemplary embodiment, first air suction fan 201 and second air suction fan 207 can be a fan, a ventilation device, etc. with 50 watts of power each.

Figure 3:
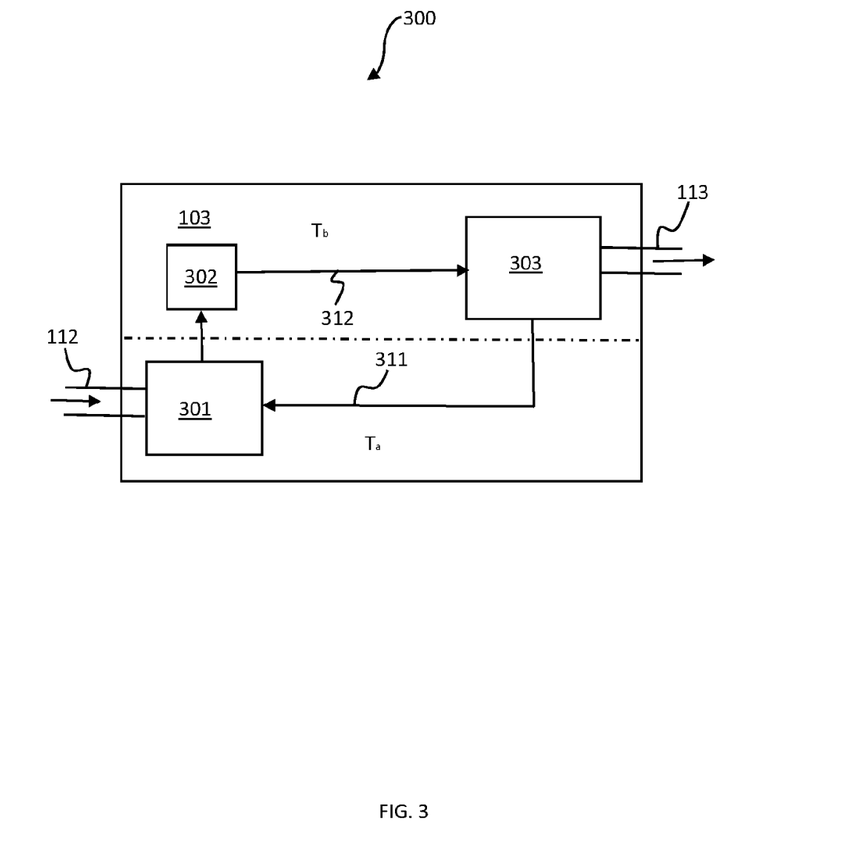
FIG. 3 is a schematic diagram of a first air conditioning module (first HVAC) in accordance with an embodiment of the present invention.

Next, referring to FIG. 3, a schematic diagram 300 of a first air conditioning module 103 is illustrated. In one exemplary embodiment, first air conditioning module 103 is bidirectional, i.e., it can either cool or heat the cleaned air input from air filtering module output channel 112. First air conditioning module 103 includes a compressor 301, a condenser 302, and an evaporator 303. In a cooling cycle, purified air from air filtering module output channel 112 is received by compressor 301. A first line 311 brings a low temperature, low pressure refrigerant gas to compressor 301. Compressor 301 squeezes the low temperature, low pressure refrigerant gas, creating a high temperature, high pressure refrigerant gas. This high temperature, high pressure refrigerant gas flows into condenser 302. Condenser 302 uses high pressure to change the high temperature and high pressure refrigerant gas into a low temperature and high pressure liquid. The low temperature and high pressure liquid goes into evaporator 303 through a second line 312. Second line 312 has a very small diameter. At the output of evaporator 303, the low temperature high pressure liquid expands to become a low temperature gas.

In a heating cycle, the above process reverses. Evaporator 303 acts as condenser 301 and vice versa. In one embodiment, a first line has a diameter of 300 mm and second line 312 has a diameter of 200 mm. First air conditioning module 103 has a capacity of 24 BTU (British thermal unit), the energy consumption during a cooling cycle is 2.7 kW and that of the heating cycle is 2.5 kW.

Continuing with FIG. 3, in another exemplary embodiment, first air conditioning unit 103 includes sensor (not shown) that receives different temperatures ($T_0$, $T_1$, $T_2$, and $T_3$) from four underground multitude of outlet channels 111, CPU 106 controls first air conditioning module 103 to generate the lowest temperature $T_0$ as common temperature $T_C$ for common room 120.

Figure 4:
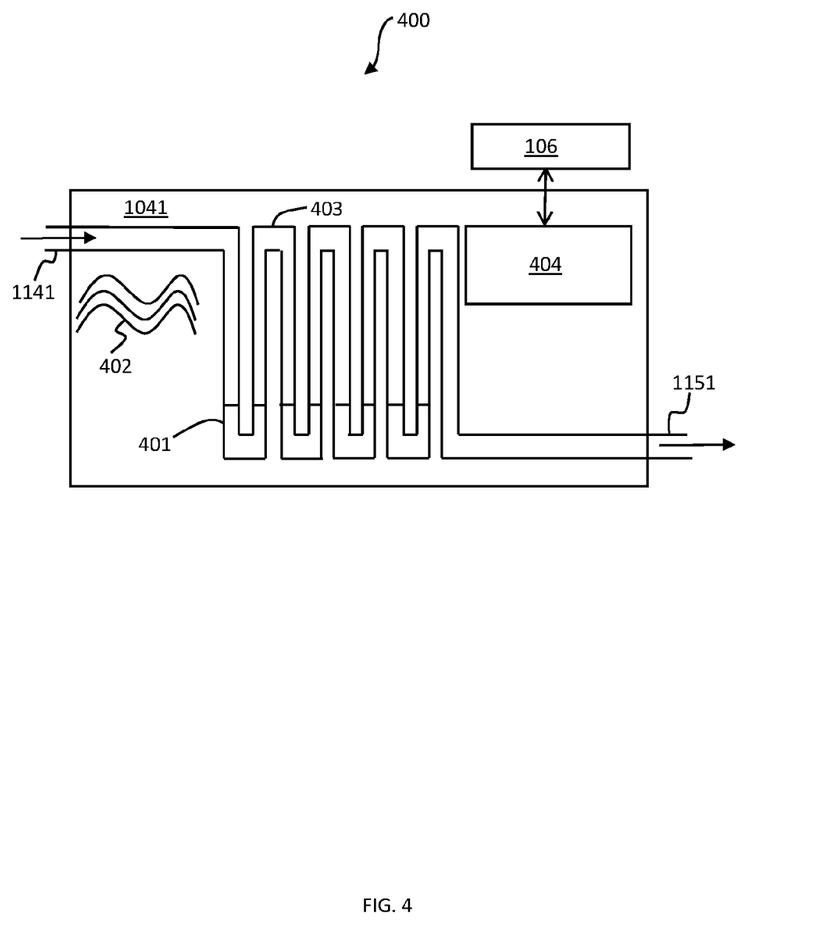
FIG. 4 is a schematic diagram of a second air conditioning module (second HVAC) in accordance with an embodiment of the present invention.

Now referring to FIG. 4, a schematic diagram 400 of second air conditioning module 104 is illustrated and disclosed. In one embodiment, each of plurality of second air conditioning modules 1041-104N is a regular air conditioner which has a cubic shape of dimensions 50 cm×50 cm×50 cm and is made of either plastic or porcelain while its exterior is covered by Styrofoam material. First air conditioning module output 113 of first air conditioning unit 102 inputs purified air at $T_0$ degrees into exterior primary air conditioning output channel 113. As exterior primary air conditioning output channel 113 enters common room 120, it splits into interior primary air conditioning input channels 1131, 1132, 1133. Inside common room 210, interior primary air conditioning input channels 1131, 1132, and 1133 fan out into secondary air conditioning module input channels 1141-114N then into plurality of second air conditioning modules 1041-104N respectively. As alluded earlier, each plurality of second air conditioning modules 1041-104N is placed right underneath each of plurality of beds 1011-101N respectively.

Continuing with FIG. 4, each plurality of second air conditioning module 1041-104N includes a compressor 401, a condenser 402, and an evaporator 403 designed to change the common temperature $T_C$ using either magnetic or infrared technology. The output of cold air at temperature $T_1$, $T_2$, $T_3$, ... $T_N$ at plurality of beds 1011-101N respectively is output at secondary air conditioning output channels 1151-115N. In an exemplary embodiment, each of plurality of second air conditioning modules 1041-104N is accompanied by temperature control units 1071-107N respectively. Each of plurality of second air conditioning modules 1041-104N is controlled either by, a timing control mode, or an auto mode. Each plurality of second conditioning module 1041-104N is adapted to change temperatures from 2-10 degrees Celsius (10° C.) and has a minimum and maximum power range of 5-25 Watts. For example, if the lowest temperature in common room 210 is 18° C., then each of plurality of secondary air conditioning module 1041-104N can change the specific temperature to 20° C. to 28° C.

Continuing with FIG. 4, CPU 106 is programmed to communicate with temperature control units 1071-107N. When the manual mode is used via temperature controller device 1071-107N, CPU 106 does not interfere and let either the particular patient or his/her nurses or doctors to set the appropriate specific temperature. Similarly, in the timing control mode, a particular temperature $T_i$, i=1, 2, 3 ..., N, is set at a specified time $t_S$, CPU 106 recognizes this and does not interfere. Second air conditioning unit 1041-104N also includes a temperature sensor 404. In one exemplary embodiment, in the auto mode, CPU 106 is programmed to set the temperature of each plurality of beds 1011-1101N based on either a habitual usage data or by the last temperature data. The habitual usage data and the last temperature data set by CPU 106 will be described in details later.

Figure 5:
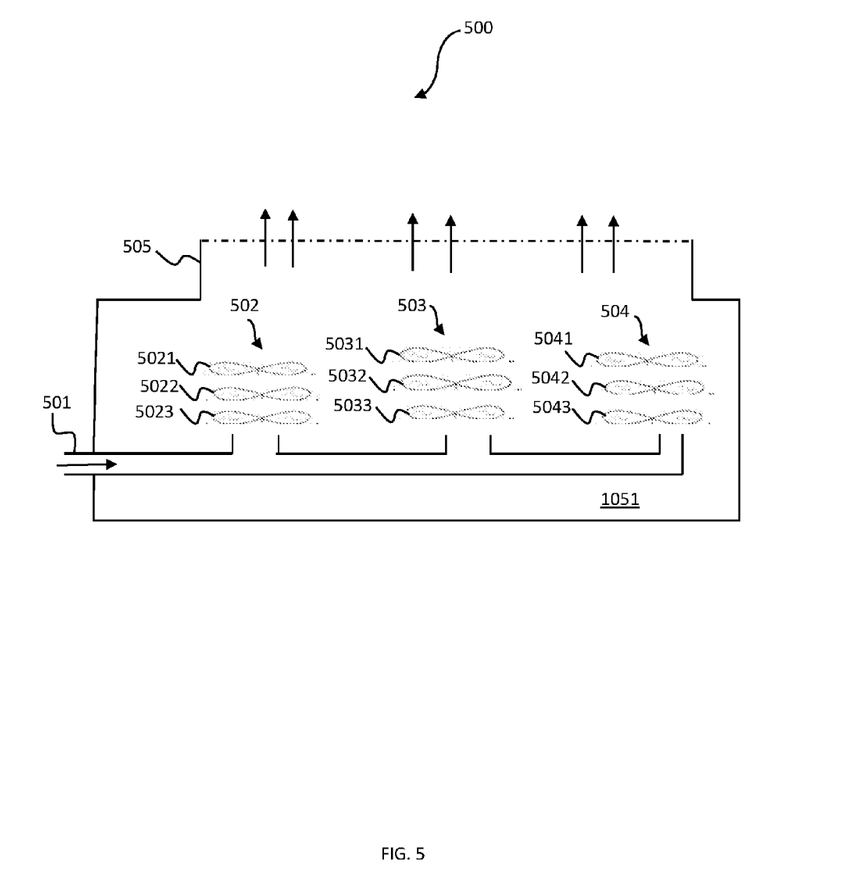
FIG. 5 is a schematic diagram of an air circulating module in accordance with an embodiment of the present invention.

Now referring to FIG. 5, a schematic diagram 500 of air circulating modules 1051-105N is illustrated. Each air circulating module 1051-105N is positioned right above each secondary air conditioning 1041-104N respectively. Each air circulating module 1051-105N is a cubic box and includes an array of fans 502, 503, and 504 arranged evenly into three columns. In one exemplary embodiment, each array of fans 502 uses three small fans 5021, 5022, and 5023. Similarly, each array of fans 503 includes three small fans 5031, 5032, and 5033; and each array of fans 504 has 5041, 5042, and 5043 small fans. In this embodiment, all small fans 5021-5043 are the same and each has a diameter of 22 cm and the length of each propellant is 10 cm. In addition, each small fan 5021-5043 uses a 0.5 amp current and 12 volts, voltage supply. Each array of fans 502, 503, and 504 receives the air at specific temperatures $T_1$-$T_N$ from secondary air conditioning modules 1041-104N at an air circulating module input 501. Arrays of fans 502-504 output a convection current of air at temperature $T_i$ (i=1, 2 ..., N) at an air circulating module output 505 from underneath each bed 1011-101N toward the ceiling of common room 120.

Figure 6:
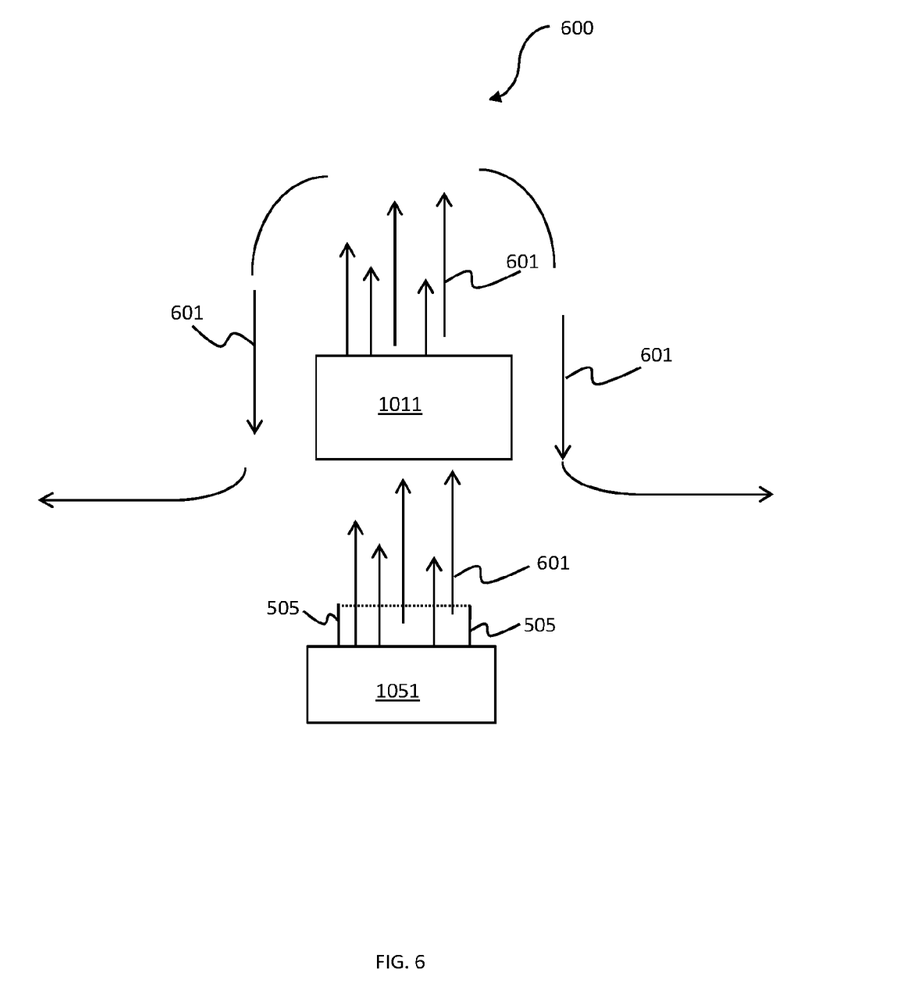
FIG. 6 is a perspective diagram illustrating a convection flow of cool air current at a specific temperature from the air circulating module to the exemplary first bed in accordance with an embodiment of the present invention.

Now referring to FIG. 6, a diagram 600 showing the direction of the convection air currents 601 from an exemplary air circulating module 1051 toward bed 1011 illustrated. As shown in this exemplary embodiment, air at temperature $T_1$, leaving air circulating module output 505 straight up toward bed 101$_1$. When air at $T_1$ reaches its apex above bed 101$_1$, it hits the warmer air layer near the ceiling of common room 120. Some of the air at $T_1$ diffuses down to the floor because air at $T_1$ is colder. Eventually, the air at specific temperature $T_1$ spreads out due to the temperature gradient with the common temperature $T_C$.

Figure 7:
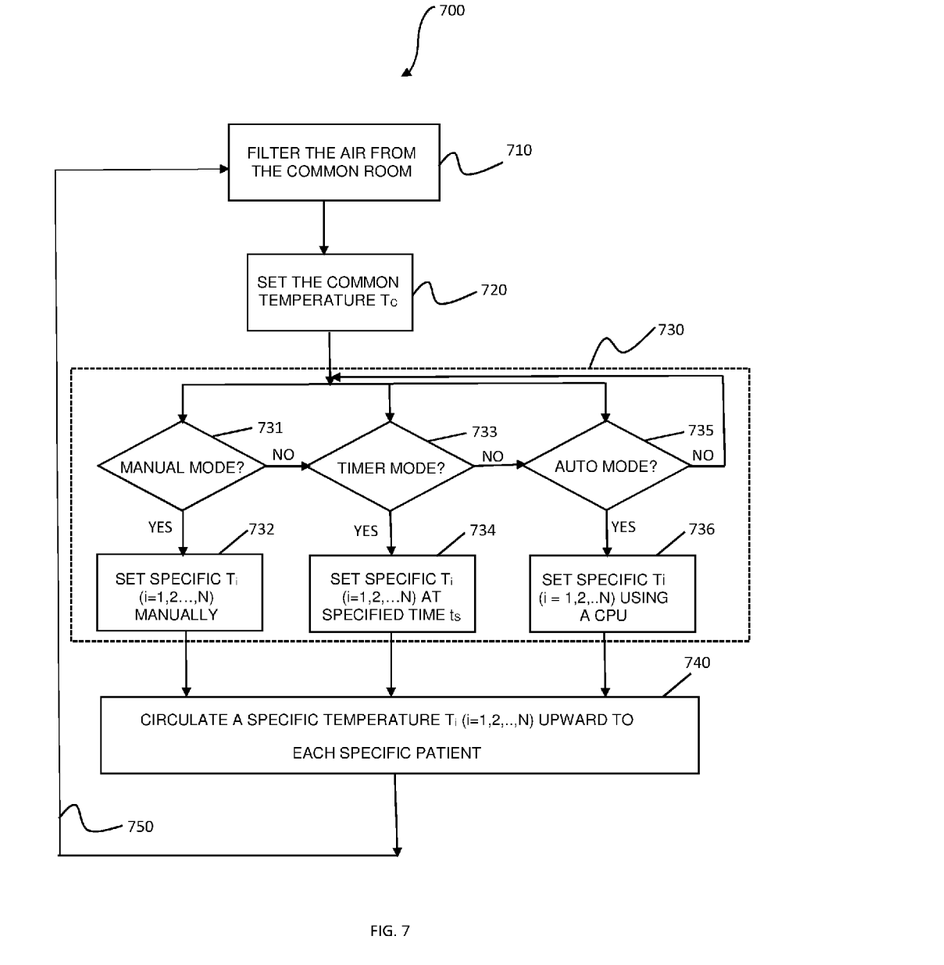
FIG. 7 is a flow chart illustrating a method for providing a specific temperature to a specific bed in a common room having a plurality of beds and a computer software program for in accordance with an embodiment of the present invention.

Finally, referring to FIG. 7, a flow chart 700 representing a method for providing a specific a specific temperature to a specific bed in a common room having a plurality of beds is illustrated. In one exemplary embodiment, flow chart 700 is performed by a software program stored in a memory of CPU 106.

At step 710, air from a common room having a plurality of beds is filtered and/or purified. Step 710 can be performed by air filtering module 102 as described above.

Next, at step 720, the output of the purified air from step 710 above is set to a common temperature $T_C$. In one embodiment, the common temperature is a preset temperature set by habitual usage data by a processor. Step 720 is carried out by primary air conditioning module 103 and processor (CPU) 106 as described above. In another embodiment, the common temperature TC is set at the lowest temperature received multitude of outlet channels 111. Temperature sensors or thermostats (not shown) that communicate any different temperatures from multitude of outlet channels 111 to CPU 106. CPU 106 selects the lowest temperature among these multitude of outlet channels 111 to set as the common temperature $T_C$.

At step 730, specific temperatures at each of plurality of beds are set. Step 730 is performed by CPU 106. The software program that performs step 730 is described in details as follows.

At step 731, if a manual mode is used, the processor hands off a temperature control unit. Then at step 732, the processor lets either users, doctors, nurses, or assistants to set the specific temperature at each bed. Step 731 and step 732 are performed by CPU 106 and temperature control unit 107$_1$-107$_N$ as described above.

If the manual mode is not set, determining whether a timing control mode is employed at step 733. If this mode is used, the specific temperature $T_1, T_2, \ldots, T_N$ is set at a specified time $t_S$ at step 734.

If the timer mode is not set, at step 735, determining whether an auto mode is set. If the answer is no, steps 731 and 733 are repeated.

At step 736, if the auto mode is set, the processor automatically sets the specific temperature at each bed.

In one exemplary embodiment, the auto mode of step 736 sets the specific temperature by two methods: last temperature data and habitual usage data. In the last temperature data, CPU 106 stores all the specific temperatures $T_1, T_2, \ldots T_N$ at each plurality of beds 101$_1$-101$_N$ in a memory storage. CPU 106 sets the specific temperature by the formula: $T = T_1(t_{off}) + (28 - T_1/16 - t)$ where $T_1(t_{off})$ is the specific temperature set at each bed last time before turning off, t is the current time.

Continuing with step 736, in the habitual usage data, habit is learned and habitual usage profile is built from observing habit of a particular user of a particular bed 101$_1$-101$_N$. If the user at bed 101$_1$ follows the habitual usage profile, a $S_0$ is recorded. In one embodiment, $S_0$ is a binary code 0. In another embodiment, $S_0$ is any computer coded signal such that CPU 106 understands that its habitual usage command is followed. On the other hand, if the user of bed 101$_1$ does not follow his or her habitual usage profile, a $S_1$ is recorded. In one embodiment, $S_1$ is a binary code 1. In another embodiment, $S_1$ is any computer coded signal such that CPU 106 understands that its habitual usage command is not followed. In other words, $S_1$ represents the situation where habitual usage command is overridden.

Continuing with step 736, sequence of $S_0$ and $S_1$ is stored over time. In one embodiment, $S_0$ and $S_1$ also contain additional information such as time of day, location for each user at each plurality of beds 101$_1$-101$_N$. The sum of $S_1$ is calculated among two sequences $S_0$ and $S_1$. In other words, $$\sum_i S_{1ij}$$

where i represents time of day and j represents a particular user at bed 101$_1$-101$_N$. For example, if at time t=6 o'clock, a user at bed 110$_1$ sets her temperature at 19° C., different from her habitual temperature of 20° C., then $S_{161}$ is set to 1. If t(6 o'clock) is a habitual 20° C. then $S_{061}$ is set to 0 ($S_0$ is set to 0). Over time, CPU 106 obtains a series of 0s and 1s and computer the sum $$\sum_i S_{1ij}.$$

Still referring to step 736, CPU 106 determines whether $$\sum_i S_{1ij} > K,$$

where K is a preset constant. In one embodiment, constant K can be reprogrammed into CPU 106. When $$\sum_i S_{1ij} > K,$$

then CPU 106 recognizes such action as a new habit. As a consequent, the habitual usage profile is reset. Then, CPU 106 issues a new specific temperature for that particular user j. In the example above, the specific temperature at bed 110$_1$ is set at 20° C. when an auto mode is used.

The sum of $S_1$ is calculated among two sequences $S_0$ and $S_1$. In other words, $$\sum_i S_{1ij}$$

where i represents time of day and j represents a particular user at bed 101$_1$-101$_N$.

Still referring to step 736, determining whether $$\sum_i S_{1ij} > K,$$

where K is a preset constant. In one embodiment, constant K can be reprogrammed into CPU 106. When $$\sum_i S_{1ij} > K,$$

then CPU 106 recognizes such action as a new habit. As a consequent, the habitual usage profile is reset. Then, CPU 106 issues a new specific temperature for that particular user j.

At step 740, the specific temperature is circulated upward from below each bed toward the user. Step 740 is realized by air circulating module 1051-105N that create the convection currents as shown in FIG. 6 above.

Finally, at step 750, after the specific temperature is set for each bed, the air from the common is circulated outside and step 710 is repeated again. Step 750 is realized by multitude of outlet channels 111 as shown in FIG. 1

Where applicable, various embodiments provided by above described method 700 may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

According to embodiments, storage media and computer readable media for containing code, or portions of code, software instructions that perform method 700 may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 smart air conditioning system (Smart HVAC)
102 air filtering module
103 primary air conditioning module
110 air filtering input channel
111 multitude of outlet channels
112 air filtering module output channel
113 exterior primary air conditioning output channel
1131-3 interior secondary air conditioning output channels
1041-N secondary air conditioning input channels
1051-N air ventilation modules
1011-N plurality of beds
1071-N temperature control units
106 processor (CPU)
201 first air suction device (fan)
202 water container input
2021 first input section
2022 second input section
203 water with neutral pH
204 silver screen
206 water container output
207 activated carbon layer
210 water tank
301 compressor
302 condenser
303 evaporator
311 first line
312 second line
401 compressor
402 condenser
403 evaporator
404 sensor or thermostat
501 air circulating module input
502 first array of fans
5021-3 small fans of array of fans
503 second array of fans
5031-3 small fans of array of fans
504 third array of fans
5041-3 small fans of third array of fans
505 air circulating module output

What is claimed is:

1. A smart air conditioning system for providing a specific temperature to a specific bed in a common room having a plurality of beds, comprising:
    an air filtering module, placed underground and outside at a first predetermined distance from said common room, operable to provide a clean air to said common room, wherein said air filtering module further comprises:
    a water container,
    a silver metal screen covering the entire surface of the water,
    a layer of activated carbon deposited upon the entire top surface area of said silver metal screen,
    a plurality of input air ducts, each having a first end placed inside of said common room and a second end bent at 90° from said first end and extends below the surface of the water of said water container, and a plurality of suction fans, each is placed on the other side of said water container opposite to said plurality of input air ducts and above the surface of said layer of activated carbon;
a primary air conditioning module, placed underground and outside at a second predetermined distance from said common room, operable to receive said clean air from said air filtering module and to provide a common temperature to the entirety of said common room;
a plurality of secondary air conditioning modules, each placed underneath each of said plurality of beds, operable to provide said specific temperature according to the preference of each user of each bed;
a plurality of air circulating modules, each placed underneath each bed and directly above said secondary air conditioning module, operable to create an updraft of said clean air and said specific temperature from underneath each bed toward the ceiling of said common room; and
a central processing unit (CPU), electrically coupled to said plurality of secondary air conditioning modules, operable to automatically set said specific temperatures of each bed in accordance with a mode selected from an auto mode, a manual mode, and a timing control mode.

2. The smart air conditioning system of claim 1 further comprises a temperature controller, electrically coupled to said CPU and said plurality of secondary air conditioning modules, operable to adjust each of said specific temperature by either said manual mode, said preset mode, or said auto mode.

3. The smart air conditioning system of claim 1 further comprises a fan module controller electrically coupled to said air circulating module, operable to adjust at least five different air circulating speeds.

4. The smart air conditioning system of claim 1 wherein said primary air conditioning module further senses said specific temperatures set by said plurality of beds and selects the lowest temperature as said common temperature.

5. The smart air conditioning system of claim 4 wherein said primary air conditioning module has a cubic shape and is made of porcelain or plastic covered by a Styrofoam material.

6. The smart air conditioning system of claim 5 wherein said primary air conditioning further comprises a temperature sensor electrically coupled to said CPU.

7. The smart air conditioning system of claim 1 wherein each of said plurality of secondary air conditioning system further comprises:
an air supply duct adapted to receive air at said common temperature from said common room;
a device operable to change said preset common temperature to said specific temperature for each of said plurality of beds; and
an output air duct connected to said air circulating system.

8. The smart air conditioning system of claim 1 wherein said air supply duct and said output air duct are made of manganese (Mn).

9. The smart air conditioning system of claim 1 wherein said device operable to change said preset common temperature to said specific temperature for each of said plurality of beds is either a magnetic or an infrared system.

10. The smart air conditioning system of claim 1 wherein said CPU further includes a memory device operable to retain said specific temperatures at any time, time turning on ($t_{ON}$) or turning off ($t_{OFF}$) of said temperature controller.

11. The smart air conditioning system of claim 10 wherein said CPU sets said specific temperature for said specific bed during said auto mode by either a habitual usage mode or a last temperature mode, wherein said habitual usage mode is established from a pattern of specific temperatures recorded in said memory by the following formula: if the sum of certain specific temperature is greater than at least 51% in comparison with other specific temperature in said sequence, then said CPU sets that particular temperature.

12. The smart air conditioning system of claim 11 wherein during said last temperature mode, said CPU is operable to adjust said specific temperature for each bed by a formula:
$T=T_1+(28-T_1/16-t)$ where $T_1$ is the specific temperature set at each bed last time before turning off, t is the current time.

13. The smart air conditioning system of claim 12 wherein during said manual mode, said CPU releases the control of said temperature controller which is set by either said patient of said specific bed or by a doctor.

14. The smart air conditioning system of claim 13 wherein during said timing mode, said CPU releases the control of said temperature controller which is now programmed to set said specific temperature at a particular time of the day.

15. A method for providing a specific temperature to a specific bed in a common room having a plurality of beds, comprising:
circulating the air inside of said common room to a filtering module along a first path using a plurality of air circulating modules;
filtering out impurities from said air to create a clean air using said filtering module and sending said clean air to said common room along a second path;
setting a common temperature for said common room using a primary air cooling module located outside of said common room; and
setting a specific temperature for each bed of said plurality of beds using a secondary air conditioning module equipped for each bed, wherein said secondary air conditioning module is controlled by a central processing unit (CPU) employing either a manual mode, an auto mode, or a timing mode, wherein said air filtering module further comprises:
a water container,
a silver metal screen covering the entire surface of the water,
a layer of activated carbon deposited upon the entire top surface area of said silver metal screen,
a plurality of input air ducts, each having a first end placed inside of said common room and a second end bent at 90° from said first end and extends below the surface of the water of said water container, and
a plurality of suction fans, each is placed on the other side of said water container opposite to said plurality of input air ducts and above the surface of said layer of activated carbon.

16. The method of claim 15 wherein said auto mode further comprises a habitual usage mode and a last temperature mode, wherein during said habitual usage mode, said specific temperature is set from a sequence of specific temperatures recorded in a memory of said CPU by the following formula: if the sum of said specific temperatures is greater than at least 51% in comparison with other specific temperature in said sequence, then said CPU selects that specific temperature for said specific bed.

17. The method of claim 15 wherein during said last temperature mode, said specific temperature is set by a formula $T=T_1+(28-T_1/16-t)$ where $T_1$ is said specific temperature set at each bed last time before turning off, t is the current time.

18. The method of claim 15 wherein said setting a common temperature for said common room further comprises:
- detecting each specific temperature at each bed;
- finding the lowest temperature among the collection of said specific temperatures at said plurality of beds; and
- setting said lowest temperature as said common temperature for said common room.

19. The method of claim 15 wherein setting a specific temperature for each bed of said plurality of beds using a secondary air conditioning module further comprises steps of circulating said specific temperature set for each of said bed using an air circulating module, wherein said circulating module further comprises:
- an air supply duct adapted to receive air at said preset common temperature from said common room;
- a magnetic device for changing said common temperature to said specific temperature for each of said plurality of beds; and
- an output air duct connected to said air circulating system.

20. The method of claim 19 wherein said air supply duct and said output air duct are made of manganese (Mn).

* * * * *

UNITED STATES PATENT AND TRADEMARK OFFICE
CERTIFICATE OF CORRECTION

| | | |
|---|---|---|
| PATENT NO. | : 10,634,374 B1 | Page 1 of 1 |
| APPLICATION NO. | : 15/482802 | |
| DATED | : April 28, 2020 | |
| INVENTOR(S) | : Thuy Van T. Duong | |

It is certified that error appears in the above-identified patent and that said Letters Patent is hereby corrected as shown below:

On the Title Page

Item (12), "Duong" should read --Duong et al.--

Item (72), should read:
--Inventors: Thuy Van T. Duong
 Phuong Dong Nguyen--

Signed and Sealed this
Twelfth Day of April, 2022

Drew Hirshfeld
*Performing the Functions and Duties of the
Under Secretary of Commerce for Intellectual Property and
Director of the United States Patent and Trademark Office*